United States Patent
Freyaldenhoven

[11] Patent Number: 5,175,742
[45] Date of Patent: Dec. 29, 1992

[54] ATMOSPHERIC PULSED GAS LASER APPARATUS

[75] Inventor: Udo Freyaldenhoven, Heistern, Fed. Rep. of Germany

[73] Assignee: Uranit GmbH, Jülich, Fed. Rep. of Germany

[21] Appl. No.: 802,183

[22] Filed: Dec. 4, 1991

[30] Foreign Application Priority Data

Jan. 30, 1991 [DE] Fed. Rep. of Germany ...... 4102683

[51] Int. Cl.⁵ .............................................. H01S 3/08
[52] U.S. Cl. ...................................... 372/104; 372/58
[58] Field of Search ............... 372/108, 98, 104, 81, 372/33, 58

[56] References Cited

U.S. PATENT DOCUMENTS

| | | | |
|---|---|---|---|
| 3,851,273 | 11/1974 | Hoag et al. | 372/104 |
| 3,936,771 | 2/1976 | Kallis | 372/104 |
| 3,949,321 | 4/1976 | Lee et al. | 372/104 |
| 4,178,078 | 12/1979 | Hausmann | 372/104 |

Primary Examiner—Leon Scott, Jr.

[57] ABSTRACT

In a pulsed gas laser apparatus for operation at ambient pressure comprising a laser module having a tubular window open at its distal end for the coupling or uncoupling of a laser beam, the tubular window has a volume which is at least equal to, or a multiple of, the volume change of the laser gas in the module during pulsed laser operation and extends essentially vertically from the laser module. The window includes a mixing zone in which during pulsed laser operation both laser gas and ambient gas are present, the window extending downwardly if the laser gas is lighter than the ambient gas and upwardly if the laser gas is heavier than the ambient gas thereby to counteract infiltration of ambient gas into the window. Also, means are provided for controlling the laser gas volume supplied to the module such that the concentration of the ambient gas in the mixing zone in the window remains below a predetermined limit.

2 Claims, 1 Drawing Sheet

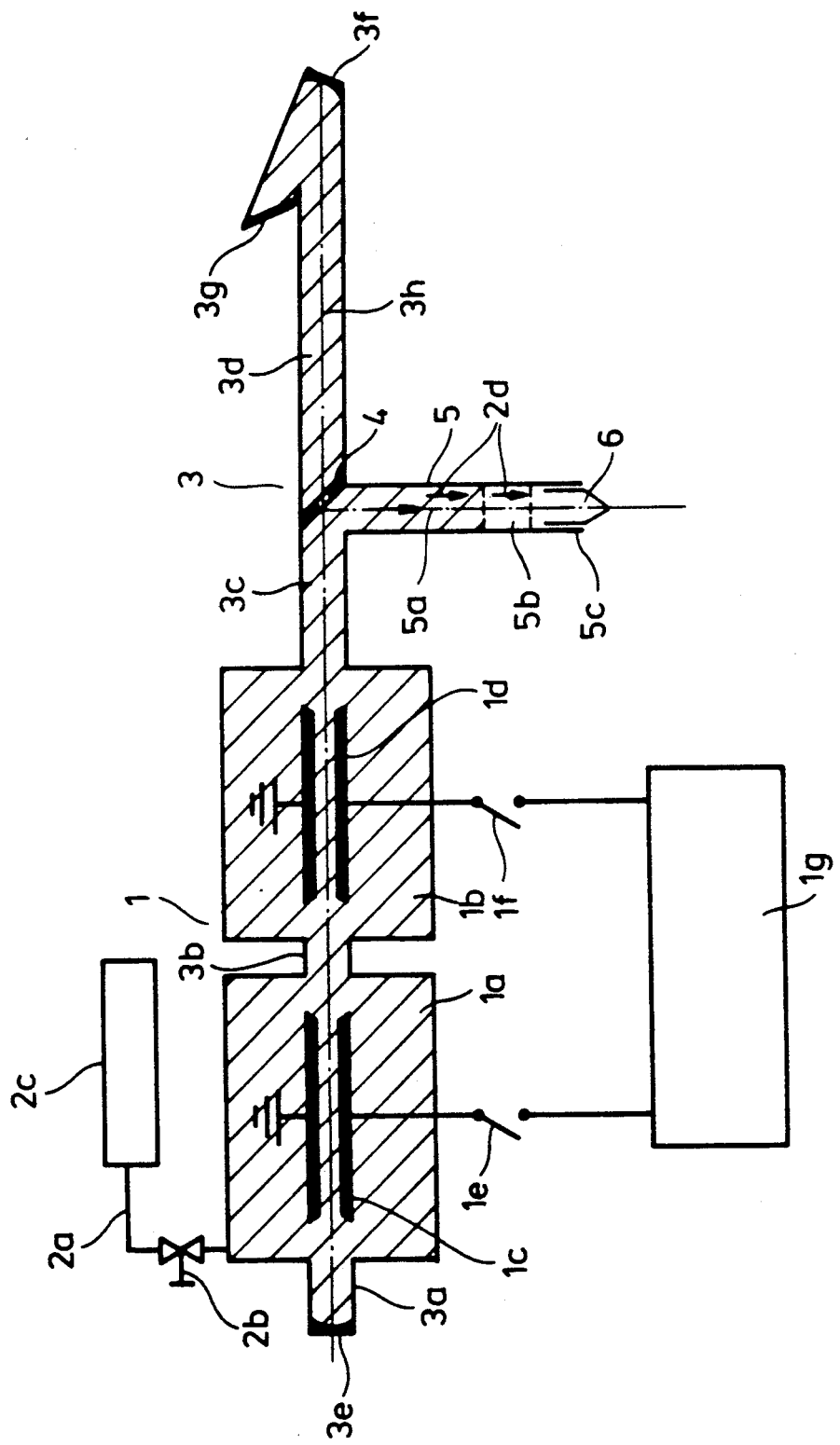

ATMOSPHERIC PULSED GAS LASER APPARATUS

BACKGROUND OF THE INVENTION

The invention relates to a pulsed gas laser apparatus such as a gas laser generator, a gas laser amplifier or a gas-filled wavelength converter operated at ambient pressure provided with laser gas supply means and having a tubular open window for in-coupling and out-coupling of a laser beam.

From the AIAA Journal, Vol. 17, No. 11, Sep. 1979, page 1267 high-power lasers which are operated under atmospheric pressure and have so-called "Free-Vortex Aerodynamic Windows" for the out-coupling of the laser beams are known. The particular design features of such windows are known from U.S. Pat. No. 3,936,771 or German Patent DE 3701718C2. Basically, there is provided some kind of gas curtain which extends across the window so as to separate the laser gas from its surroundings.

The magazine "Laser Und Optoelektronik" 21 (4) 1989, on pages 67 to 71 describes an aerodynamic window with axial gas flow (p. 67) for $CO_2$ high-power lasers which have discharge or resonator chambers with internal pressures of typically 100 m bar. With such a window which operates in principle like an ejector, there is an unavoidable loss of laser gas which needs to be replenished constantly. This type of window as well as the type described first require powerful pump or compressor systems with all the concurrent expenditures.

It is the object of the present invention to provide a laser apparatus of the type described with design features that simplify the apparatus and operational requirements for maintaining separation at the window between the laser gas and the ambient gas.

SUMMARY OF THE INVENTION

A pulsed gas laser apparatus, such as a laser beam generator, a gas laser amplifier or gas-filled wavelength converter, for operation at ambient pressure, which includes a laser module having a tubular window open at its distal end for the coupling or uncoupling of a laser beam and having a volume which is at least equal to, or a multiple of, the volume change of the laser gas in the module during pulsed laser operation. The tubular window extends essentially vertically and includes a mixing zone in which, during pulsed laser operation, laser gas and ambient gas are present, the window extending downwardly if the laser gas is lighter and upwardly if the laser gas is heavier than the ambient gas so as to counteract infiltration of ambient gas into the window. Further, means are provided for controlling the laser gas volume supplied to the module such that the concentration of the ambient gas in the mixing zone remains below a predetermined limit.

Preferably dosaging of the laser gas supply to the module and window volume are adjusted with regard to one another such that the laser gas volume discharged through the window corresponds to, or is slightly higher than the laser gas exchange rate required for the operation of the gas laser apparatus.

The invention utilizes the recognition that, in a vertically arranged elongate tube, the different buoyancy forces of the laser gas and the surrounding gas, which is normally air, are sufficient even with a relatively low flow speed of the laser gas to keep laser gas and surrounding gas separated. Since, in the laser apparatus of the type with which the present invention is concerned, generally the laser gas has to be exchanged at a certain rate in any case, it is advantageous if the laser gas dosage provided from the gas supply is so adjusted to the volume of the window that the gas consumption corresponds about to that exchange rate or is only a little higher.

BRIEF DESCRIPTION OF THE DRAWING

The sole FIGURE is a cross-sectional view of the laser according to the invention.

DESCRIPTION OF THE PREFERRED EMBODIMENT

As shown in the FIGURE a pulsed $CO_2$ TEA laser 1, 3 includes an oscillator 1 having two modules 1a, 1b equipped with electrodes 1c, 1d connected to a high-tension power supply 1g by way of a switch 1e, 1f. The module 1a is connected to a laser gas supply 2c by way of a duct 2a provided with a dosaging valve 2b. The laser cavity 3 is represented by a horizontal tubular body 3a, 3b, 3c, 3d which extends through the module 1a, 1b and which, at one end 3a, is limited by a Cu mirror 3e and, at its other end, by a Cu mirror 3f and a grid 3g arranged at an angle with respect to the Cu mirror 3f. Between the sections 3c and 3d of the tubular body there is provided a Cu uncoupler 4 which has a central opening and which is inclined by an angle of 45° with respect to the axis 3b of the tubular body. At the Cu uncoupler 4, a tubular window 5 projects from the tubular section 3c with its longitudinal axis 5a extending in a vertical downward direction and, at its bottom end is in open communication with the surrounding atmosphere. The diameter of the window 5 is somewhat larger than the diameter of the laser beam 6 to be uncoupled.

During pulse operation of the laser apparatus, the volume of the laser gas periodically changes in such a manner that it expands for a short period of time during a pulse and then contracts again. The amount of such periodic volume change depends on the intensity of the pulses. The volume of the window 5, that is, with a predetermined window diameter, the length of the window 5 is so selected that it is at least as large as the periodic volume changes and preferably a multiple of the periodic volume changes of the laser gas caused by the pulse operation of the laser. If the maximum expansion of the laser gas volume is, for example, 0.2 l, the window in this example may be selected to be about 30 cm long provided it has a diameter of about 5 cm. During pulse operation, a mixing zone 5b forms in the window 5, the volume of which at the lower open end 5c of the window is somewhat larger than 0.2 l.

Since the laser gas is generally lighter than the surrounding air, the buoyancy force of the laser gas in the mixing zone is directed upwardly whereas the corresponding force effective on the air is directed downwardly toward the open end 5c of the window 5. If the surrounding gas is helium which is lighter than the laser gas the conditions are reversed. In such a case the window is arranged so as to extend upwardly from the tubular section 3c.

In order to counteract diffusion of air from the mixing zone 5b into the laser cavity 3 or into the oscillator 1, a certain amount of laser gas 2d is constantly discharged through the window 5. This amount supplied from the gas supply 2c is controlled by the dosaging valve 2b so that the concentration of the surrounding gas, that is, generally air, entering the laser volume 1, 3 remains below a predetermined limit under which operation of the laser is not impaired.

The inventive concept may be utilized in a corresponding manner also in connection with gas laser amplifiers or with gas-filled wavelength converters. In each case the pumps or compressors and associated components as well as the use of special gases, which are normally required in connection with such gas windows, are not needed.

LISTING OF REFERENCE NUMERALS

1: Oscillator
1a: Module
1b: Module
1c: Electrode
1d: Electrode
1e: Switch
1f: Switch
1g: High-tension power supply
2a: Duct
2b: Dosaging valve
2c: Laser gas supply
2d: Laser gas amount
3: Laser cavity
3a: End of laser cavity
3b: Tubular section
3c: Tubular section
3d: End of laser cavity
3e: Cu mirror
3f: Cu mirror
3g: Grid
3h: Body axis
4: Cu uncoupler
5: Window
5a: Longitudinal axis
5b: Mixing zone
5c: Open end
6: Laser beam

What is claimed is:

1. In a pulsed gas laser apparatus for operation at ambient pressure, said apparatus including a laser module, means for supplying laser gas to said laser module, said module having a tubular window open at its distal end for coupling and uncoupling of a laser beam, the improvement comprising;
   a) said tubular window having a volume which is at least equal to, or a multiple of, a volume change of the laser gas in the module during pulsed laser operation;
   b) the tubular window extends from the laser module in an essentially vertical orientation and includes a mixing zone in which during said pulsed operation laser gas and ambient gas are both present, said tubular window extending from the laser module downwardly when the laser gas is lighter than the ambient gas and upwardly when the laser gas is heavier than the ambient gas; and
   c) means for controlling the laser gas volume supplied to said module which is discharged through said tubular window such that a concentration of the ambient air entering said mixing zone through the open distal end of said window remains below a predetermined limit.

2. A pulsed gas laser apparatus according to claim 1, wherein dosaging of the laser gas supply to said module and the volume of the window are adjusted with regard to one another such that the laser gas volume supplied to the module and discharged through the window corresponds to, or is slightly higher than, the laser gas exchange rate required for the operation of the gas laser.

* * * * *